US010613049B2

(12) United States Patent
Rocznik et al.

(10) Patent No.: US 10,613,049 B2
(45) Date of Patent: Apr. 7, 2020

(54) CAPACITIVE SENSOR FOR DETECTING A MEDIUM, AND CORRESPONDING METHOD

(71) Applicant: Robert Bosch GmbH, Stuttgart (DE)

(72) Inventors: Marko Rocznik, Pliezhausen (DE); Philipp Digeser, Kreuzlingen (CH)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 15/117,136

(22) PCT Filed: Dec. 2, 2014

(86) PCT No.: PCT/EP2014/076264
§ 371 (c)(1),
(2) Date: Aug. 5, 2016

(87) PCT Pub. No.: WO2015/117692
PCT Pub. Date: Aug. 13, 2015

(65) Prior Publication Data
US 2017/0168001 A1    Jun. 15, 2017
US 2019/0391104 A2    Dec. 26, 2019

(30) Foreign Application Priority Data
Feb. 7, 2014    (DE) .................. 10 2014 202 248

(51) Int. Cl.
*G01N 27/22*    (2006.01)
(52) U.S. Cl.
CPC ......... *G01N 27/225* (2013.01); *G01N 27/228* (2013.01)
(58) Field of Classification Search
CPC .................... G01N 27/225; G01N 27/228
See application file for complete search history.

(56) References Cited

U.S. PATENT DOCUMENTS

| | | | | |
|---|---|---|---|---|
| 3,255,410 A | * | 6/1966 | Norwich | ............... G01N 27/223 324/608 |
| 2008/0262748 A1 | | 10/2008 | Ossart et al. | |
| 2012/0253691 A1 | * | 10/2012 | Graf | ..................... G01N 27/223 702/24 |

FOREIGN PATENT DOCUMENTS

| | | |
|---|---|---|
| CN | 1749743 A | 3/2006 |
| DE | 102012106939 A1 | 1/2014 |
| EP | 2508881 A1 | 10/2012 |

OTHER PUBLICATIONS

International Search Report dated Feb. 4, 2015, of the corresponding International Application PCT/EP2014/076264 filed Dec. 2, 2014, 4 pages.

(Continued)

*Primary Examiner* — Xin Y Zhong
(74) *Attorney, Agent, or Firm* — Norton Rose Fulbright US LLP; Gerard Messina (57) ABSTRACT

A sensor for detecting a medium, including a capacitive measuring device having at least two electrodes and at least one dielectric, and including an electronic device, which is configured to ascertain a variable regarding and/or dependent on capacitance and to determine an information item regarding the presence of the medium and/or its concentration in view of the ascertained variable; the electronic device being additionally configured to vary a voltage applied between the electrodes, using at least two frequencies, the variable being ascertainable for each of the frequencies, with the aid of the electronic device, a deviation variable regarding a deviation of the variables ascertained for the different frequencies from one another being able to be determined, and the information item being able to be determined in additional view of the deviation variable. In addition, the present invention relates to a method for operating a capacitive measuring device.

8 Claims, 4 Drawing Sheets

(56) References Cited

OTHER PUBLICATIONS

Andrew R.K. Ralston et al., "Capacitance Humidity Sensor", MRS Proceedings, vol. 382, Jan. 1, 1995, XP055164839, pp, 272-275.
Denice D. Denton et al., "The Long Term Reliability of a Switched-Capacitor Relative Humidity Sensor Systemu", Proceedings of the 33rd Midwest Symposium on Circuits and Systems, Calgary, Aug. 12-15, 1990, New York, IEEE, US, Conf. 33, Aug. 12, 1990, XP000295234, pp. 854-857.
Wang Yun et al., "A capacitive humidity sensor based on ordered macroporous silicon with thin film surface coating", Sensors and Actuators B 149, Chemical: International Journal Devoted to Research and Development of Physical and Chemical Transducers, Elsevier S.A, CH, Bd. 149, No. 1, Aug. 6, 2010, XP027174072, pp. 136-142.
Viviani M. et al., "Barium perovskites as humidity sensing materials", Journal of the European Ceramic Society, Elsevier Science Publishers, Essex, GB, vol. 21, No. 10-11, Jan. 1, 2001, XP027557296, pp. 1981-1984.
Faia et al., "Humidity sensing properties of a thick-film titania prepared by a slow spinning process", Sensors and Actuators B 101: Chemical: International Journal Devoted to Research and Development of Physical and Chemical Transducers, Elsevier S.A, CH, Bd. 101, No. 1-2, Jun. 15, 2004, XP004510310, pp. 183-190.

\* cited by examiner

CAPACITIVE SENSOR FOR DETECTING A MEDIUM, AND CORRESPONDING METHOD

FIELD

The present invention relates to a sensor for detecting at least one medium. In addition, the present invention relates to a method for operating a capacitive measuring device.

BACKGROUND INFORMATION

A fluid sensor is described in European Patent No. EP 2 508 881 A1. The fluid sensor includes a capacitive measuring device having at least two electrodes and at least one dielectric present between the at least two electrodes. Water molecules penetrate the at least one dielectric as a function of a relative humidity, which causes its permittivity to change. This produces a change in the at least one capacitance between the at least two electrodes. A voltage is applied to the at least two electrodes in order to operate the moisture sensor of European Patent No. EP 2 508 881 A1. In addition, a temperature present in the surroundings is measured by a temperature sensor element and is taken into account in the determination of an output value for the relative humidity.

SUMMARY

The present invention provides a sensor for detecting at least one medium, and a method for operating a capacitive measuring device.

The present invention allows a state of aging and/or state of contamination of the sensor/the capacitive measuring device to be measured easily, and therefore allows the state of aging and/or state of contamination to be considered in the determination of the at least one information item outputted. In this manner, in spite of comparatively long use of the sensor/capacitive measuring device, it is still possible to ascertain information regarding the presence of the at least one medium and/or its at least one concentration with relatively high accuracy and a comparatively low error rate. Even if the sensor/capacitive measuring device is used in a comparatively problematic environment generating a large risk of contamination, reliable values may still be ascertained and outputted with the aid of the present invention. Therefore, the present invention increases a time period of use/lifetime of the sensor/capacitive measuring device and also improves its ability to be used in environments generating a comparatively high risk of contamination.

With the aid of the present invention, costs of exchanging or repurchasing the sensor/capacitive measuring device after a conventional service life may be saved. In addition, reconditioning of the sensor/capacitive measuring device, as is conventionally often necessary for removing the molecules that have penetrated between the at least two electrodes, is rendered superfluous by the present invention. In addition, it is emphasized that in comparison with conventional reconditioning, the present invention is comparatively simple to implement.

Instead of eliminating aging effects and/or contamination on the sensor/capacitive measuring device, the present invention allows the consequences of aging effects and/or contamination to be corrected/compensated for. With the aid of the correction/compensation, it may be ensured that the information outputted by the sensor/capacitive measuring device still has a low error rate, even in spite of significant aging/contamination of it. In particular, aging drift/contamination drift of the values measured by the sensor/capacitive measuring device may be removed by correction.

In one advantageous specific embodiment of the sensor, the electronic device is also designed to determine the at least one information item in view of a variable ascertained at exactly one predefined frequency, and to correct or redetermined the at least one information item prior to its output in view of the at least one deviation variable. For example, if the at least one deviation variable is comparatively large, the electronic device may be configured to derive a correction factor from the at least one deviation variable; aging-dependent or contamination-dependent influences on the information item being able to be removed by correction, using the correction factor. Such an evaluation method may be reliably implemented by a comparatively small, lightweight and inexpensive electronic device.

For example, the electronic device may also be configured to determine an aging factor and/or a contamination factor in view of the at least one deviation variable and to determine, correct or redetermine the at least one information item in view of the determined aging factor and/or contamination factor. Consequently, a multitude of different aging effects and contamination effects on the sensor may be corrected with the aid of a comparatively simple procedure on the at least one information item outputted.

In addition, the electronic device may optionally be designed to redetermine the at least one deviation variable, the aging factor and/or the contamination factor in a merely periodic manner, or triggered by a control signal provided externally or internally. Consequently, if desired, the electronic device may carry out self-calibration in regular intervals, by which high accuracy and a relatively low error rate of the at least one outputted information item may be ensured. Alternatively, however, the at least one deviation variable (and/or the aging factor/contamination factor) may also only be redetermined, when the electronic device is triggered to do so, or when, e.g., using a sensor element situated internally in the sensor, the presence of causes is detectable, which have a high probability of affecting the aging state and/or contamination state.

In one advantageous specific embodiment, the capacitive measuring device and the electronic device are formed on and/or in a common semiconductor substrate. However, as an alternative, the capacitive measuring device and the electronic device may also be formed on different semiconductor substrates. This ensures a high level of design freedom when developing the sensor.

In one advantageous further refinement, the sensor additionally includes a temperature measuring device, which may be operated and evaluated by the electronic device. Consequently, a temperature present at the sensor may also be considered during operation of the capacitive measuring device and/or in the determination of the at least one information item.

The advantages described above are also ensured in the implementation of a corresponding method for operating a capacitive measuring device. The method may be refined further in accordance with the different specific embodiments of the sensor.

BRIEF DESCRIPTION OF THE DRAWINGS

Additional features and advantages of the present invention are explained below, with reference to the figures.

DETAILED DESCRIPTION OF EXAMPLE EMBODIMENTS

FIG. 1*a* to 1*e* show schematic partial views of a first specific embodiment of the sensor, as well as coordinate systems for explaining its characteristics.

Figure 1A:
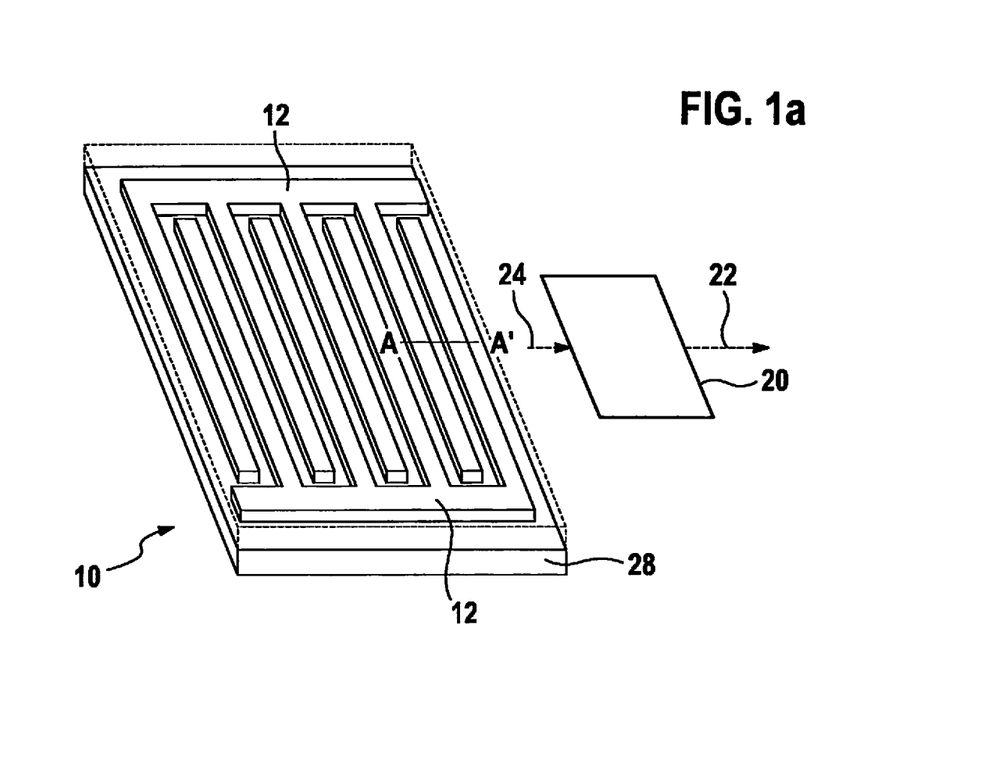
FIG. 1a to 1e show schematic partial views of a first specific embodiment of the sensor, and coordinate systems for explaining its characteristics.
Figure 1B:
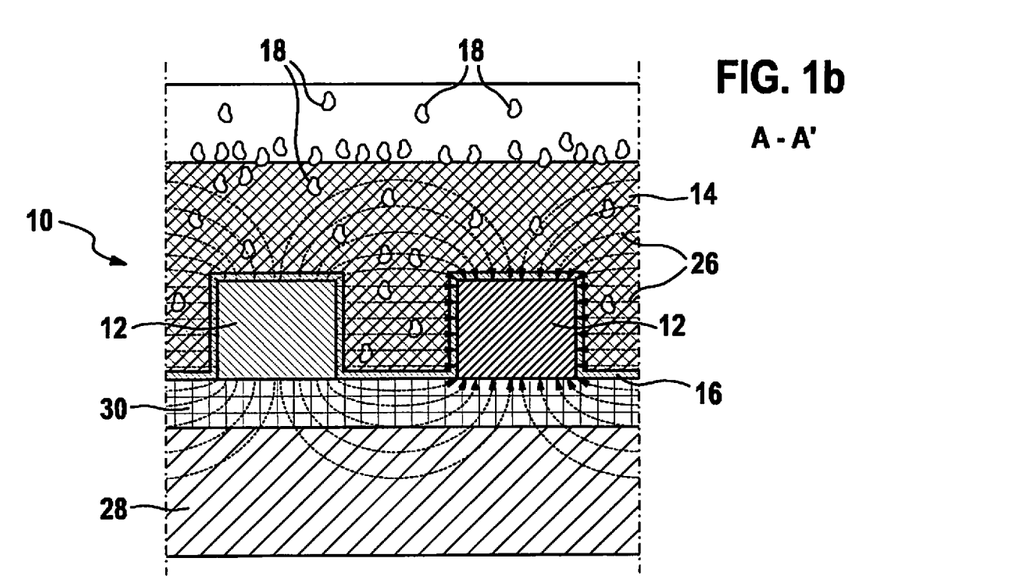

The sensor schematically represented by FIGS. 1*a* and 1*b* is configured to detect at least one medium. The detection of the at least one medium may be understood to mean that the sensor recognizes the presence (of at least a predetermined/only just detectable, minimum concentration) of the at least one medium. However, as an alternative, or in addition to that, the sensor may also be configured to ascertain the concentration of the at least one medium.

Therefore, in particular, the sensor may also be understood to be a medium concentration sensor or medium concentration measuring sensor.

Merely by way of example, the sensor represented by FIGS. 1*a* and 1*b* takes the form of a moisture sensor. Thus, the sensor detects the presence of moisture (at or above the predefined/presently just detectable, minimum concentration) and may measure the humidity. However, it is emphasized that the design of the sensor as a moisture sensor in FIGS. 1*a* and 1*b* is to be interpreted as merely an example. The ability to manufacture the sensor is not limited to a particular medium to be identified/detected. For example, a gas concentration or solid particulate concentration may also be measurable by the sensor.

The sensor includes a capacitive measuring device 10 having at least two electrodes 12. Merely by way of example, the two electrodes 12 in FIG. 1*a* take the form of comb electrodes. Differently shaped electrodes of a stray field capacitor, a plate-type capacitor or another type of capacitor may also be used as electrodes 12. It is also emphasized that the ability to manufacture capacitive measuring device 10 is not limited to the number of exactly two electrodes 12.

At least one dielectric 14 is present between the at least two electrodes 12. The at least one dielectric 14 is to be understood as a material, into which the at least one medium, such as water molecules 18, may diffuse/penetrate. In addition, at least one permittivity of the at least one dielectric 14 is a function of at least a concentration of the at least one medium between the at least two electrodes 12. Therefore, at least one capacitance C present between the at least two electrodes 12 may be varied (as a function of the at least one concentration of the at least one medium between the at least two electrodes 12). A change in capacitance C may be, in particular, linear with respect to the at least one concentration of the at least one medium. For example, at least one polymer may be present as the at least one dielectric 14 between the at least two electrodes 12.

FIG. 1*b* shows a cross-section along line AA' of FIG. 1*a*. It can be seen that the at least two electrodes 12 may optionally be covered by a protective layer 16, onto which the at least one dielectric 14 is deposited, and which protects electrodes 12 from direct contact with the at least one medium, e.g., with water molecules 18. However, protective layer 16 may also be omitted during the manufacture of the sensor.

In the example of FIG. 1*a* through 1*e*, the at least one dielectric 14 is a polyimide layer 14, whose permittivity changes as a function of the concentration of the water molecules 18 diffused into it. However, it is emphasized that the ability to manufacture capacitive measuring device 10 is not limited to the use of a particular material for the at least one dielectric 14. With increased aging of capacitive measuring device 10, influences such as the temperature and the humidity cause cracking of polyamide layer 14 by hydrolysis and oxidation. In addition, different functional groups having dipole properties may insert themselves into polyimide layer 14 and therefore significantly intensify the hydrophilic characteristics of polyimide layer 14. With increased aging of polyimide layer 14, water molecules 18 (or other intercalated molecules of the at least one medium to be detected) and/or foreign molecules become more securely bonded in it. The water molecules 18/foreign molecules more securely bonded due to the increased polarity only exit polyimide layer 14 upon input of more energy. Generally, water molecules 18 may only be removed from aging polyimide layer 14 at high temperatures, for example, at temperatures of at least 150° C. Such intense heating of polyimide layer 14 may be referred to as reconditioning. However, reconditioning is mostly only implementable under laboratory conditions. Therefore, during normal operation of the sensor, water molecules 18 are often not able to be removed (completely). In addition, after reconditioning, it is to be expected that polyimide layer 14 will once again immediately retain water molecules 18 securely. Therefore, reconditioning only produces a relatively short-term restoration of polyimide layer 14.

In addition, the polyimide layer 14 partially decomposed by hydrolysis may also be condensed again, that is, restored to its original form. To that end, however, temperatures even higher than for reconditioning are needed over a comparatively long period of time. In particular, the temperatures must be sufficient for curing polyimide layer 14. However, subjecting the sensor to such high temperatures will damage it with a high probability.

Thus, generally, conventional concentration measuring devices exhibit, with their increased aging, an aging drift of the values measured and outputted by them. In addition, with increased aging, an offset drift and a linearity drift, which are represented by the coordinate systems of FIGS. 1*c* and 1*d*, occur at capacitive measuring device 10.

Figure 1C:
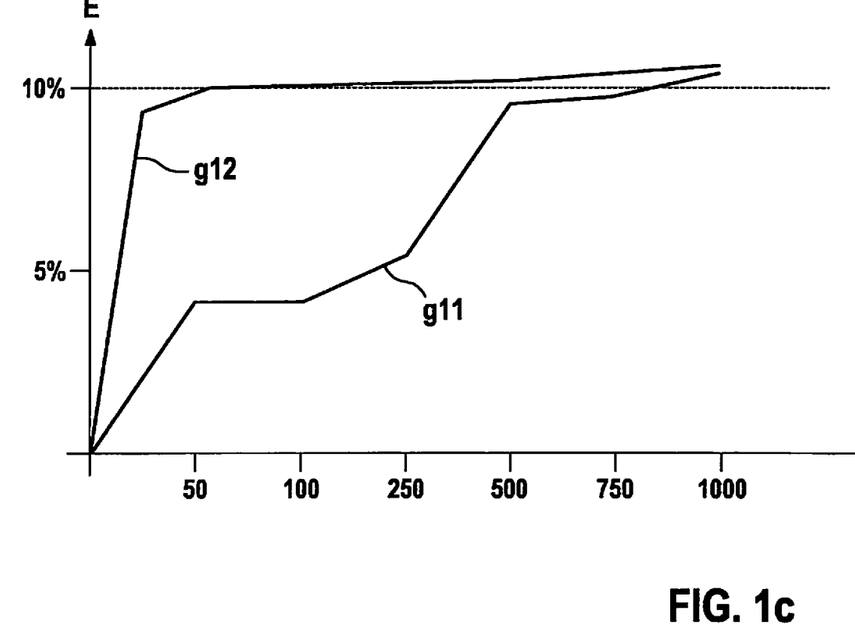

In the coordinate system of FIG. 1*c*, the abscissa is an age/an elapsed operating time t of capacitive measuring device 10 (in hours). Occurring errors E (in percent) are represented by the ordinate of the coordinate system of FIG. 1*c*. Graph g11 shows the offset drift. Graph g12 indicates the linearity drift.

Figure 1D:
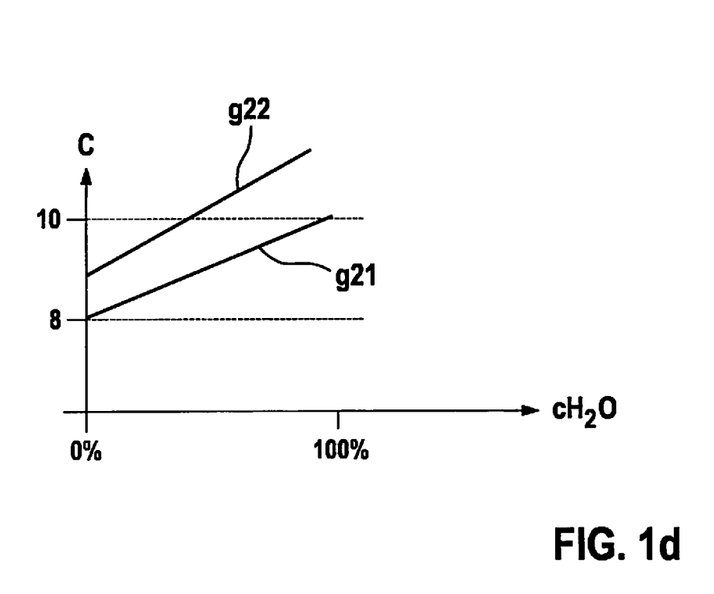

The abscissa of the coordinate system of FIG. 1*d* indicates the atmospheric moisture concentrations $cH_2O$ (in % rH) occurring in a surrounding area of capacitive measuring device 10. The ordinate of the coordinate system of FIG. 1*d* represents capacitances C measured at these atmospheric moisture concentrations $cH_2O$.

At an age/an elapsed operating time t of capacitive measuring device 10 of 0 hours, the values measured with the aid of graph g21 are measured. In contrast, after an age/an elapsed operating time t of capacitive measuring device 10 of 1000 hours, capacitances C of graph g22 are ascertained. (Therefore, if the equipment of the sensor were limited only to capacitive measuring device 10 and a conventional driver device, then, in the case of an age/an elapsed operating time t of capacitive measuring device 10 of 1000 hours, the capacitances C indicated by graph g22 would be evaluated without correction.)

However, the sensor of FIG. 1a to FIG. 1e includes an electronic device 20, which is not only configured to determine and output at least one information item 22 regarding a presence of the at least one medium and/or the at least one concentration of the medium, but also to compensate for/correct/redetermine information item 22 prior to the outputting of information item 22, in view of a value representing the state of the at least one dielectric 14.

Therefore, the offset drift and the linearity drift do not contribute to the deterioration of the information item 22 able to be outputted by electronic device 20, since information item 22 is correctible or may be redetermined prior to outputting it.

In particular, electronic device 20 is configured to vary a voltage applied between the at least two electrodes 12, using at least two different frequencies f. For each of the (at least two different) frequencies f, electronic device 20 ascertains at least one variable regarding variable capacitance C and/or dependent on variable capacitance C. This may also be paraphrased, such that with the aid of electronic device 20, a detection method/capacitance detection method is implementable, which is capable of accurately ascertaining the at least one variable 24 at different frequencies f/excitation frequencies. The at least one variable 24 may be, for example, a current intensity and/or capacitance C. However, it is emphasized that the ability to manufacture electronic device 20 is not limited to the determination of a current intensity/capacitance C as the at least one variable 24.

At least one deviation variable (differential variable) Δ1 through Δ3 regarding a deviation of the variables 24 ascertained for the different frequencies f from one another may be determined with the aid of electronic device 20. Electronic device 20 is also configured to determine the at least one information item 22 not only in view of the at least one ascertained variable 24, but also in additional view of the at least one deviation variable (differential variable) Δ1 through Δ3.

For example, as the at least one information item 22, it may be able to be determined and outputted, that the at least one medium, such as water molecules 18, is present between the at least two electrodes 12 and, therefore, also in at least part of a surrounding area of the sensor (at at least a predefined/presently just detectable, minimum concentration). However, the at least one concentration of the medium may also be determined and outputted as the at least one information item 22. Therefore, the sensor may be useful for ascertaining a multitude of information items and measured variables.

In the specific embodiment of FIG. 1a through 1e, electronic device 20 is configured to determine the at least one information item 20 in view of a variable 24 ascertained at exactly one predefined frequency f. Electronic device 20 then corrects the at least one information item 22 in view of ascertained deviation variable Δ1 through Δ3.

Figure 1E:
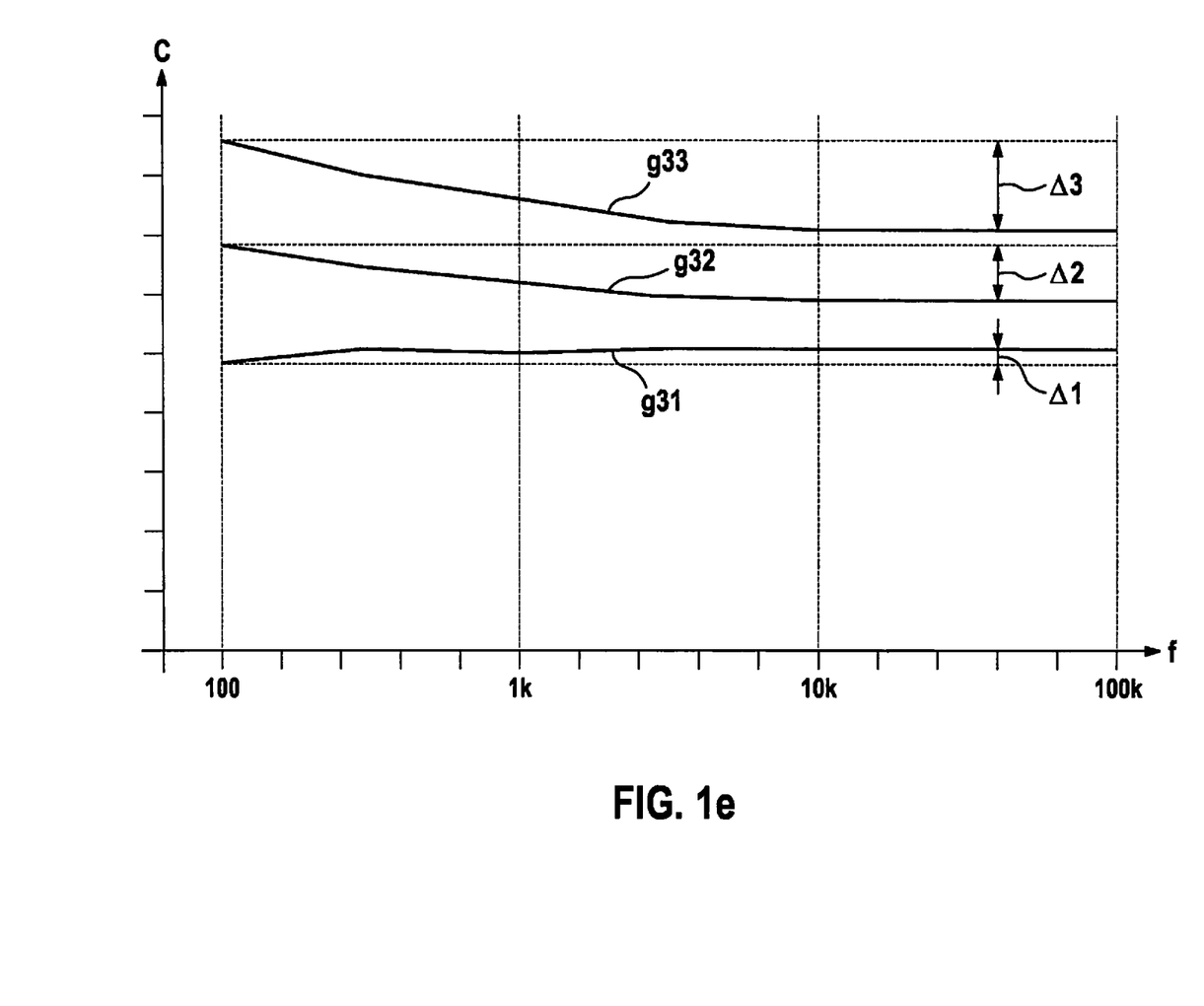

FIG. 1e shows a coordinate system, whose abscissa indicates the frequencies f (in Hz) at which the voltage applied between electrodes 12 is varied. Capacitance C, which is measured, in each instance, at different frequencies f as the at least one variable 24, is represented by the ordinate of the coordinate system of FIG. 1e. (The capacitances C drawn into the coordinate system of FIG. 1e are all measured at an equal atmospheric moisture concentration $cH_2O$ that is held constant.)

A graph g31 indicates the capacitances C ascertained by a new capacitive measuring device 10 (at an age/elapsed operating time of 0 hours) for various frequencies f. The values of graph g32 are measured by a capacitive measuring device 10 at an age/an elapsed operating time of 50 hours.

While measuring the values of graph g33, capacitive measuring device 10 has an age/an operating time of 150 hours.

As is apparent from the coordinate system of FIG. 1e, with increasing age of capacitive measuring device 10, deviation variable Δ1 through Δ3 increases between the capacitances C measured at a frequency f of 100 Hz and the capacitances C measured at a frequency f of 100 kHz, respectively. For the example of polyimide layer 14 as the at least one dielectric 14, as well as of water molecules 18, this may be attributed to the fact that with increasing degradation of polyimide layer 14, water molecules 18 experience a reduction in their freedom of motion. Therefore, an interaction of water molecules 18 with the alternating electric field 26 present between the at least two electrodes 12 changes with increasing degradation of polyimide layer 14. Although the age-related change in deviation variables Δ1 through Δ3 is explained by the example of polyimide layer 14 and water molecules 18, the underlying effect is not limited, however, to the materials described here.

It is emphasized that the determination of the at least one variable 24 for different frequencies f may be carried out in a comparatively short time period. Consequently, only a very short period of time is necessary for determining the at least one deviation variable Δ1 through Δ3.

Therefore, unwanted changes in capacitance due to a change in the at least one dielectric 14 and/or due to penetration of water molecules/foreign molecules may be balanced out on the basis of the advantageous determination of the at least one deviation variable Δ1 through Δ3. In particular, electronic device 20 may be configured to determine an aging factor and/or a contamination factor in view of the at least one deviation variable Δ1 through Δ3, and to determine, correct or redetermine the at least one information item 22 in view of the determined aging factor and/or contamination factor. Consequently, even after long operation of the sensor, and also in an environment exhibiting a high contamination risk, high accuracy and a lower error rate of the at least one outputted information item 22 is ensured.

Therefore, reconditioning or curing of the at least one dielectric 14 is no longer necessary. Instead, in the case of the sensor, an error diagram of an aging drift and/or of a contamination drift at different frequencies is ascertained with the aid of the at least one deviation variable Δ1 through Δ3. A frequency dependence of the molecules of the at least one medium to be detected and/or of the foreign molecules may be used in an advantageous manner. Since this frequency dependence changes with a change in the properties of the at least one dielectric 14, the error diagram may be determined reliably. Instead of eliminating aging effects and/or contamination, it is possible to compensate for the aging effects and the contamination by qualitatively or quantitatively determining the error diagram. In addition, in this manner, a frequency-dependent characteristic of the error diagram may be tested instead of having to measure a further measured variable. This operation may also be described as measuring a dielectric relaxation.

In the specific embodiment of FIG. 1a through 1e, capacitive measuring device 10 is formed on and/or in a semiconductor substrate 28. Semiconductor substrate 28 may be a silicon substrate, for example. However, in place of or in addition to silicon, semiconductor substrate 28 may also include other materials. In particular, a surface of semiconductor substrate 28 may be covered at least partially by at least one dielectric layer 30; the at least two electrodes 12 and the at least one dielectric 14 being deposited onto the at least one dielectric layer. However, the layer construction represented in FIG. 1b is only to be interpreted as an example.

In one advantageous specific embodiment, capacitive measuring device 10 and electronic device 20 may be formed on and/or in a common semiconductor substrate 28. This is easily implementable, since both capacitive measuring device 10 and electronic device 20 may be manufactured, using a CMOS process. However, as an alternative, capacitive measuring device 10 and electronic device 20 may also be formed on different support structures.

Figure 2:
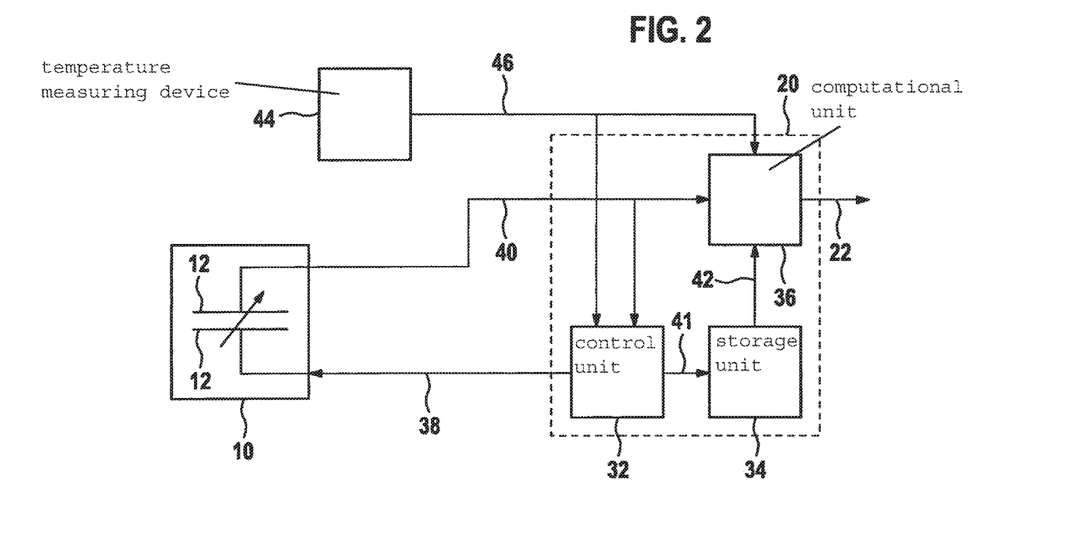
FIG. 2 shows a schematic representation of a second specific embodiment of the sensor.

FIG. 2 shows a schematic representation of a second specific embodiment of the sensor.

The sensor schematically represented in FIG. 2 has, in addition to capacitive measuring device 10, another electronic device 20, which includes a control unit 32, a storage unit 34 and a computational unit 36. The voltage varied using different frequencies f is applied between the at least two electrodes 12 of capacitive measuring device 10 in a controlled manner with the aid of a control signal 38 of control unit 32. An algorithm may be stored on control unit 32 for that purpose.

In each instance, the at least one ascertained variable is outputted to computational unit 36, using a data signal 40. Data signal 40 may also be supplied to control unit 32. For example, control unit 32 may relay the at least one ascertained variable to storage unit 34, using a deviation signal 41.

Computational unit 36 is configured to ascertain the at least one deviation variable already described above, using the data supplied by data signal 40. Computational unit 36 then compensates for the information item ascertained at a single predefined frequency, in view of the at least one ascertained change variable. In this context, computational unit 36 may retrieve a look-up table 42 used by storage unit 34, an equation, a measurement characteristic and/or a conversion formula.

The sensor of FIG. 2 also includes a temperature measuring device 44, which may be operated and evaluated by electronic device 20. A temperature signal 46 ascertained by temperature measuring device 44 may be supplied to both control unit 32 and computational unit 36. Consequently, the temperature present at the sensor may also be considered during operation of capacitive measuring device 10 and/or in the determination of the at least one information item 22 outputted later.

Electronic devices 20 of the above-described sensors may be specially configured to redetermine the at least one deviation variable (or the aging factor and/or contamination factor) merely periodically or aperiodically (sporadically). This may also be paraphrased, such that the above-described sensors are configured for a self-test conducted merely periodically or aperiodically (sporadically) (by redetermining the at least one change variable). Between two self-tests, the sensors may determine, correct or redetermine the at least one information item 22 during their normal operation, using at least one change variable determined during an earlier measurement/a previous self-test. Since experience shows that an aging process is a very slow process, it is sufficient to recalculate the aging in long intervals.

Aperiodic/sporadic redetermination of the at least one deviation variable (that is, the aging factor and/or the contamination factor) may be understood to mean that electronic device 20 is triggered for this operation by an externally or internally supplied control signal. For example, the control signal may be outputted to electronic device 20 by at least one external or internal sensor element; the control signal prompting the electronic device to conduct the above-described self-test. Consequently, the self-test may be conducted specifically after recognition of causes of a probable change of state at the capacitive measuring device. For example, the sensor may deliberately react to an extreme temperature and/or to penetration of liquid/grime, using a self-test.

All of the above-described sensors may be integrated into an air-mass flow sensor.

Figure 3:
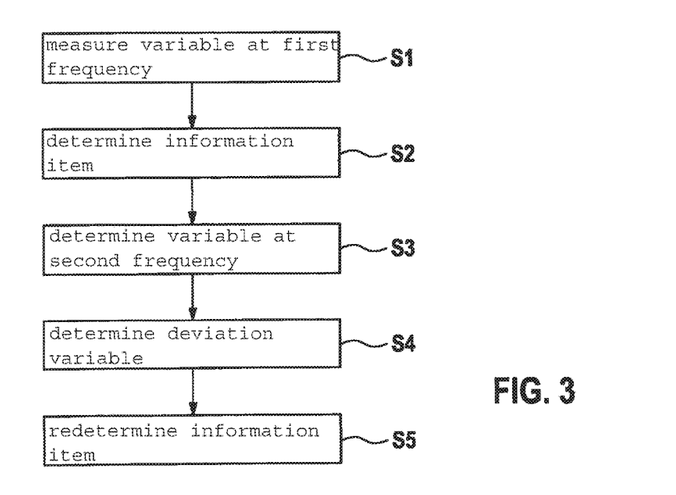
FIG. 3 shows a flow chart for explaining a specific embodiment of the method for operating a capacitive measuring device.

FIG. 3 shows a flow chart for explaining a specific embodiment of the method for operating a capacitive measuring device.

The method described below may be implemented, for example, using the capacitative measuring device schematically represented in FIGS. 1a and 1b. However, it is emphasized that the ability to execute the method is not limited to this capacitive measuring device. Instead, the method may be executed by any capacitive measuring device, which includes at least two electrodes and at least one dielectric present between the at least two electrodes. The dielectric is to be understood as a material, whose at least one permittivity is a function of at least one concentration of at least one medium between the at least two electrodes, which means that at least one capacitance present between the at least two electrodes varies.

During the method, a voltage applied between the at least two electrodes is varied, using at least two different frequencies. At least one variable regarding the varying capacitance and/or dependent on the varying capacitance is ascertained for each of the frequencies. At least one deviation variable (differential variable) regarding a deviation of the variables ascertained for the different frequencies from one another is determined. The at least one deviation variable may be, for example, a difference between a variable measured at a first frequency and a variable determined at a second frequency. A deviation/spread of a plurality of variables ascertained at different frequencies from an average value may also be defined as the at least one deviation variable.

The determination of at least one information item regarding the presence of the at least one medium and/or of the at least one concentration of the at least one medium is carried out in view of at least one of the ascertained variables and of the at least one deviation variable. The determined information item is subsequently outputted.

In the specific embodiment of FIG. 3, in a method step S1, the at least one variable is initially measured at exactly one predefined (first) frequency. In a method step S2, the at least one information item is then determined in view of the variable ascertained at exactly the one predefined frequency.

In a further method step S3, the at least one variable is determined at at least one further (second) frequency (not equal to the first frequency). (Alternatively, method step S3 may be executed prior to method step S2.) In a method step S4, at least one deviation variable is determined in view of the variables measured in method steps S1 and S3. In addition, in a method step S5, the information item (determined in method step S2) is redetermined or corrected in view of the at least one deviation variable.

Optionally, in an intermediate step between method steps S4 and S5, an aging factor and/or a contamination factor may be determined in view of the at least one deviation variable. In this case, in method step S5, the at least one information item is redetermined or corrected in view of the determined aging factor and/or contamination factor.

As an option, the at least one deviation variable may also be redetermined only periodically or aperiodically (sporadically). Consequently, method steps S3 and S4 may be omitted in the meantime. For example, method steps S3 and S4 may only be executed when it can be assumed, with a high probability, that a change has meanwhile occurred at the at least one dielectric.

Although the present invention has been described with the aid of preferred exemplary embodiments, it is not limited to these. Thus, for example, although described above using three deltas, an arbitrary number of deltas is possible as a function of the aging. Or in other words, the deltas are only examples for different aging stages. The delta increases as a function of the aging and the frequency.

What is claimed is:

1. A sensor for detecting at least one medium, comprising:
    a capacitive measuring device having at least two electrodes and at least one dielectric present between the at least two electrodes, at least one permittivity of the at least one dielectric being a function of at least one concentration of the at least one medium between the at least two electrodes, through which at least one capacitance present between the at least two electrodes is variable; and
    an electronic device which is configured to ascertain a variable at least one of: i) regarding the variable capacitance, and ii) dependent on the variable capacitance, and to determine and output at least one information item regarding a presence of at least one of: i) the at least one medium, and ii) the at least one concentration of the at least one medium in view of the at least one ascertained variable;
    wherein the electronic device is additionally configured to vary a voltage applied between the at least two electrodes, using at least two different frequencies, the at least one variable being ascertainable for each of the frequencies, and at least one deviation variable regarding a deviation of the variables ascertained for the different frequencies from one another being able to be determined by the electronic device, and the at least one information item being able to be determined in additional view of the at least one deviation variable,
    wherein the determination of the at least one variable occurs at an equal atmospheric moisture concentration or between the two frequencies of 100 Hz and 100 kHz,
    wherein the electronic device is configured to determine at least one of an aging factor and contamination factor, in view of the at least one deviation variable, and to determine, correct or redetermine the at least one information item in view of the at least one of the aging factor and the contamination factor.

2. The sensor as recited in claim 1, wherein the electronic device is additionally configured to determine the at least one information item in view of a variable ascertained at exactly one predefined frequency, and to correct or redetermine the at least one information item prior to its output in view of the at least one deviation variable.

3. The sensor as recited in claim 1, wherein the electronic device is configured to redetermine the at least one deviation variable, the aging factor and the contamination factor one of: i) periodically, or ii) when triggered by an externally or internally supplied control signal.

4. The sensor as recited in claim 1, wherein the capacitive measuring device and the electronic device are formed at least one of on and in a common semiconductor substrate.

5. The sensor as recited in claim 1, further comprising:
    a temperature measuring device, which may be operated and evaluated by the electronic device.

6. A method for operating a capacitive measuring device including two electrodes and at least one dielectric present between the at least two electrodes, at least one permittivity of the dielectric being a function of at least one concentration of at least one medium between the at least two electrodes, through which at least one capacitance present between the at least two electrodes varies, the method comprising:
    varying a voltage applied between the at least two electrodes, using at least two different frequencies;
    ascertaining at least one variable regarding at least one of: i) the varying capacitance, and ii) dependent on the varying capacitance, the at least one variable being ascertained for each of the frequencies;
    determining at least one deviation variable regarding a deviation of the variables ascertained for the different frequencies from one another;
    determining and outputting at least one information item regarding a presence of at least one of: i) the at least one medium, and ii) of the at least one concentration of the at least one medium, the at least one outputted information item being determined taking into account at least one of the ascertained variables and of the at least one deviation variable
    wherein the determination of the at least one variable occurs at an equal atmospheric moisture concentration or between the two frequencies of 100 Hz and 100 kHz,
    wherein at least one of an aging factor and a contamination factor is determined taking into consideration the at least one deviation variable, and the at least one information item is determined, redetermined or corrected in view of the at least one of the determined aging factor and the determined contamination factor.

7. The method as recited in claim 6, wherein the at least one information item is determined taking into consideration a variable ascertained at exactly one predefined frequency, and the information item is redetermined or corrected taking into consideration the at least one deviation variable.

8. The method as recited in claim 6, wherein at least one of: i) the at least one deviation variable, ii) the aging factor, and iii) the contamination factor, is redetermined only periodically or aperiodically.

* * * * *